United States Patent
Nelke et al.

(10) Patent No.: US 9,043,294 B2
(45) Date of Patent: May 26, 2015

(54) MANAGING OVERFLOW ACCESS RECORDS IN A DATABASE

(75) Inventors: Sebastian Nelke, Schoenaich (DE); Martin Oberhofer, Bondorf (DE); Yannick Saillet, Stuttgart (FR); Jens Seifert, Gaertringen (DE); Knut Stolze, Jena (DE)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 13/410,548

(22) Filed: Mar. 2, 2012

(65) Prior Publication Data

US 2012/0246132 A1    Sep. 27, 2012

(30) Foreign Application Priority Data

Mar. 21, 2011   (EP) .................................... 11158976

(51) Int. Cl.
 *G06F 17/30*   (2006.01)
(52) U.S. Cl.
 CPC .... *G06F 17/30377* (2013.01); *G06F 17/30339* (2013.01)
(58) Field of Classification Search
 CPC ..................... G06F 17/30377; G06F 17/30339
 USPC .................................. 707/696, 753, 830, 814
 See application file for complete search history.

(56) References Cited

U.S. PATENT DOCUMENTS

| | | | |
|---|---|---|---|
| 4,912,629 A * | 3/1990 | Shuler, Jr. | 707/999.206 |
| 5,721,915 A * | 2/1998 | Sockut et al. | 707/999.2 |
| 6,668,263 B1 * | 12/2003 | Cranston et al. | 707/999.003 |
| 6,950,834 B2 | 9/2005 | Huras et al. | |
| 7,177,885 B2 | 2/2007 | Isip et al. | |
| 7,555,491 B2 | 6/2009 | Cole et al. | |
| 2001/0047360 A1 * | 11/2001 | Huras et al. | 707/102 |
| 2009/0049110 A1 | 2/2009 | Plow et al. | |
| 2009/0049199 A1 | 2/2009 | Kuik et al. | |

OTHER PUBLICATIONS

Gary H. Sockut, Balakrishna R. Iyer, "Online Reorganization of Databases" (Jul. 2009), ACM Computing Surveys, vol. 41, pp. 8, 26, 84.*

Whitlark, Fred, "DB2 for z/OS: DB2 database design", Article [online], [published Aug. 19, 2004], [retrieved on Jul. 7, 2014], Retrieved from the internet: http://www.ibm.com/developerworks/data/library/techarticle/dm-0408whitlark/.*

* cited by examiner

*Primary Examiner* — James Trujillo
*Assistant Examiner* — Giuseppi Giuliani
(74) *Attorney, Agent, or Firm* — Cantor Colburn LLP (57) ABSTRACT

Overflow access records (OARs) are managed in a database system. An OAR is created in response to receiving an update command for a data record and to the updated data record generated by the update command not fitting onto the page in the table where the data record was stored. The OAR that is created includes an index counter that indicates a number of indexes associated with the table. When an OAR is accessed in response to a query command, an identifier of the accessed OAR is replaced in the index by an identifier of a data record pointed to by the OAR, and the index counter in the accessed OAR is changed by a predefined amount. When the index counter reaches a predefined value, the accessed OAR is removed from the table.

17 Claims, 5 Drawing Sheets

MANAGING OVERFLOW ACCESS RECORDS IN A DATABASE

PRIORITY

This application claims priority to European Patent Application No. EP11158976.8, filed Mar. 21, 2011, and all the benefits accruing therefrom under 35 U.S.C. §119, the contents of which in its entirety are herein incorporated by reference.

BACKGROUND

The present invention relates generally to a database, and more specifically, to managing overflow access records in a database.

Databases, in particular relational databases, underlie many of today's business and technical systems. They are convenient tools for storing and accessing data in a direct manner using keys and indexes. A relational database system typically includes a series of database tables, each organized into pages which store data records. A data record may have a fixed or variable length. Typical database commands include add a data record, read or query a data record, update a data record and delete a data record.

Indexes may be used in order to improve (e.g. decrease) access time to records in a database. Index creation is a well-known technique in the field of relational databases. There may be many indexes for a single database table because a record may include many fields or attributes, and fast access to the record may be required under many different access paths. Scanning the complete content of a database table entry by entry (i.e., record by record) may be very time consuming. Indexes, either as primary keys which are unique or, as secondary keys which may have double entries, are regularly used for faster access to defined data records. When a data record is updated, the indexes are also updated, which can also be a very time consuming process depending on the technique used. If a data record has a variable length because one or more attributes of the table have a variable length, the updated data record may no longer fit onto a page of the table. Typically, pages have a defined fixed length in a database system. Four kilobytes (kBs), eight kBs, sixteen kBs, and thirty-two kBs are common page sizes.

Several approaches have been taken in order to deal with records not fitting onto a page in a database system. U.S. Pat. No. 7,555,491 discloses techniques to repair overflow rows in a relational database table. In one implementation, the physical memory pages of a source table are interrogated to identify overflow rows. In another implementation, overflow rows generated during database update operations are identified from non-table sources (e.g., log files). In general, overflow rows are repaired by unloading one or more rows identified as overflow rows, locking the source table from outside access, disabling or deleting any associations with the unloaded rows, deleting the identified overflow/unloaded rows from the source table; reloading the previously unloaded rows back into the source table, restoring any associations previously disabled/deleted, and unlocking the tables. Rows may be processed in groups that are small enough not to significantly impact users accessing either the source or associated tables. U.S. Pat. No. 7,555,491 discloses removing overflow rows after they are created. The tables need to be locked; and thus, these techniques may require taking the database system offline such that a normal online operation may no longer be possible.

U.S. Pat. No. 7,177,885 discloses a method of reorganizing a table space in a database. It includes reading a row of data from the database, analyzing the row of data read out from the database, determining whether to eliminate or retain the row of data based on at least one predetermined rule, reloading the row of data into the database when it is determined that the row of data complies with the predetermined rule, eliminating the row of data when it is determined that the row of data does not comply with the predetermined rule, and rebuilding an index related to the database to include keys that correspond to the reloaded row of data.

U.S. Patent Publication No. 2009/0049199 discloses an apparatus and system for reorganizing a set of database partitions based on a ranked set of database partitions. The apparatus includes an evaluation module to determine a fragmentation indicator for each database partition within a set of database partitions. A ranking module ranks the set of database partitions according to a rank criterion. The rank criterion may include, at a minimum, the fragmentation indicator. A reorganization module reorganizes a subset of the database partitions in the ranked set of database partitions. The subset is selected, at least in part, by a rank order for the ranked set of database partitions. The subset may be selected such that ranked database partitions, satisfying a dynamic reorganization threshold, are included in the subset.

Another commonly used approach to solving the issue of updates in a database system is to use percentage free space (PCTFREE) (see details see below). If PCTFREE is set too large, too much disk space may be wasted and/or the buffer pool hit ratio may decrease because more pages may need to be read to fulfill a select request because fewer records per page are transferred. If PCTFREE is not set at all or is too small, a lot of overflow access records may be created on update operations or on insert operations in tables with clustered index structures and/or a page lock may lock too much information, thus reducing concurrency. Moreover, reorganization may be required to reconcile overflow access records to improve performance. Offline reorganizations may often be unacceptable and online reorganizations may cause significant input/output, thus decreasing performance of regular workloads. If PCTFREE is set incorrectly (too small, too large) and needs to be changed, a reorganization of the database system may be required. For databases with large numbers of tables, administrators may not have time to manually determine the right PCTFREE setting so PCTFREE may either be set wrong or not at all (meaning to zero). Furthermore, administrators may forget to adjust PCTFREE if record compression is enabled, potentially causing significantly more overflow access records.

SUMMARY

Embodiments include methods, engines, and computer program products for managing overflow access records (OARs) in a database system. A database command is received at the database system. The data base system includes tables, and each table includes pages that include data records. An OAR is created if the database command is an update command for a data record located on a page in a table and the updated data record generated by the update command does not fit onto the page in the table. The OAR that is created includes an index counter and points to the updated data record on a further page of the table. The index counter indicates a number of indexes associated with the table and the created OAR replaces the data record stored on the page in the table. An index information buffer is maintained such that for each index, identifiers of OARs are maintained together with a related index. If the database command is a query command, an index is used and an OAR is accessed. In addition, the identifier of the accessed OAR is replaced in the index by an identifier of a data record pointed to by the OAR, and the index counter in the accessed OAR is changed by a predefined amount. In response to the index counter being equal to a predefined value after the changing, the accessed OAR is removed from the table and the identifier of the accessed OAR is removed from the index information buffer. In response to the index counter not being equal to the predefined value after the changing, the index information buffer is updated by removing the association of the accessed OAR with the index.

BRIEF DESCRIPTION OF THE SEVERAL VIEWS OF THE DRAWINGS

The drawings referenced in the present application are only used to exemplify typical embodiments of the present invention and should not be considered to be limiting the scope of the present invention.

DETAILED DESCRIPTION

Embodiments include a method and engine for managing overflow access records (OARs) in a database system. Embodiments include an efficient manner of removing OARs during online processing by maintaining a reference counter in the overflow record and through modifications to the processing of structured query language (SQL) queries that allow the detection of overflow accesses.

As used herein, the term "database system" refers to a system for storing and managing large amounts of data in an organized manner for easy update and retrieval. The data is stored in digital form, and types of database systems include hierarchical databases, object databases and relational databases. Typically, standardized SQL is used for manipulating data stored in a database. In a relational database, the data is stored in tables that are organized into records (rows) and columns.

A storage space for a database is typically composed of database pages. Each page typically has a predefined size, e.g., four kilobytes (kBs). Other page sizes are also possible, e.g., two kBs, eight kBs, sixteen kBs. A limited number of records may fit onto a page, depending on the length of the individual records. Records may have a fixed length or a variable length.

As used herein, the term "percentage free space" (PCTFREE) refers to a concept of organizing data records onto database pages. During a normal load (or also as part of a reorganization of a database) a certain percentage of storage is kept free on every database page. This allows for easy and fast insertion of new records onto a page. Additionally, update operations will also have better performance, in particular when an updated data record requires more space than the original record.

As used herein, the term "record identification" (RID) refers to a unique identifier for each record in a database. Database systems generally use RIDs to access a specific record in a database.

As used herein, the term "index" refers to an index to a database table to allow faster access to records in the database table with defined criteria. The index may be maintained in a separate data structure outside of the table containing the data (e.g., in an additional database table). The index uses RIDs as pointers to specific records in a database table.

As used herein, the term "index scan" refers to reading an index only when looking for a data record in a database. An index contains a subgroup of data elements of the related data record. Sometimes this subgroup of data elements is sufficient for a query against the database, and an access to the data table via an RID may not be required at all. An index may also store the RIDs of the data records of a related data table.

As used herein, the term "index counter" refers to a simple numerical data field adapted for storing integer values.

As used herein, the term "overflow access record" or OAR refers to a record of a database system (in particular a relational database system) that is stored instead of an updated data record when the updated data record does not fit onto the page where the record was stored before the update happened. This is the case, for example, when a record becomes longer during an update procedure. In accordance with an embodiment, the updated data record is stored on another page having sufficient free space for the updated data record. Often, these pages are new database storage pages. An RID pointing to the new location of the updated data record is stored in the OAR. In accordance with an embodiment, an access to such an updated data record is performed as follows: a query identifies a specific record via an index, and the RID in the index entry is read. The database system may want to access the relevant record, however, only the related OAR may be stored at the place that the RID specifies. In this case, the OAR is read and the database system finds in the OAR, the new RID pointing to the new position of the specified record.

As used herein, the term "update command" refers to a command to a database specifying a record that needs an update. An updated data record is inserted into the database system after the update. However, as explained above, the newly updated data record may be longer than the original, non-updated data record.

The above described method of managing overflow access records provides several advantages. In particular, the method decreases difficulties in dealing with PCTFREE concepts. For example, when a table space or a table is created, there are no historic statistics available for a database administrator to use in deciding what value for PCTFREE is right. If PCTFREE is set incorrectly, it may cause too much wasted disk space, a need for too many reorganizations of the database system to fix performance issues caused by OARs, and/or too many page splits to be required. Thus, setting PCTFREE to an incorrect value may negatively affect performance of online transaction processing (OLTP). Once set, a selected PCTFREE may not be changed in a table space or a table without a reorganization operation. Reorganizations may have negative impacts as previously outlined. Databases used by packaged enterprise applications may have several thousand or even more tables. It may be impossible to manually analyze all of these tables to set PCTFREE appropriately. When record compression is enabled, the risk of OARs significantly increases, particularly for update operations when the data record size increases. Therefore, PCTFREE may need to be adjusted whenever record compression is enabled for a table. Again, this presents a challenge to database administrators because they would need to think about a value for PCTFREE upfront and they would need to do it for potentially a large number of tables.

Embodiments of the present invention deliver an efficient procedure that removes OARs during online processing and therefore makes expensive database reorganization operations and tuning of PCTFREE unnecessary. This is achieved by maintaining a reference counter in the OAR, and through modifications during the processing of SQL queries that allow detecting overflow accesses. In this manner, OAR issues are automatically and independently resolved and cleaned up.

Embodiments avoid having to set PCTFREE too large just to avoid OARs, and may lead to a reduction in the amount of wasted disk space. In addition, embodiments provide a simplification of data base administrator work by avoiding erroneous configurations, such as setting PCTFREE to the wrong value. PCTFREE maintenance for thousands or tens of thousands of tables is simplified and thus, the likelihood that PCTFREE is set correctly is improved. If record (or row) compression is turned on, administrators will not have to remember to reset PCTFREE because it is adjusted automatically. An embodiment results in an optimal usage of I/O (input/output) and buffer-pool resources with an ideal hit ratio because PCTFREE can be set to zero or to a very small value and therefore unnecessary free space on pages is avoided.

An embodiment includes scanning the index of a table and replacing each identifier (e.g., RID) in the index with the new location of the record. The scanning is performed asynchronously and independently of normal online read/insert/update/delete commands of the database system. In addition, the index reference counter in the OAR is changed by a predefined amount, and if the index counter is at a predefined value (e.g., zero) after the changing, the overflow access record is removed from the table (e.g., from the data page) and the identifier of the OAR is removed from the index information buffer. If the index counter is not at the predefined value after the changing, the index information buffer is updated by removing the association of the OAR with the index. This is helpful when the overflow access record is not removed by a normal query command, e.g., if index only scans are performed or there is no access via a specific index over a long period of time such that the temporary OAR construct survives longer than expected.

In accordance with an embodiment, when the database command is an update command, and when the table has no index, and if an updated data record does not fit onto a page, instead of creating an OAR, the updated data record is inserted into another page of the table having sufficient free space. If there is no page having sufficient free space, a new page is created at the end of the table and the updated data record is stored in the new page.

Embodiments described herein also apply to the case where a table in a database system does not have an index. When a table does not have an index, the management of OARs is avoided, thereby reducing further overhead associated with clean-up processes. It is also noted that in an embodiment, during any update, not only for tables having no index, the database locks the data record prior to updating it and unlocks the data record after the update has been finalized.

According to another embodiment, when the database command is an update command, and the table has exactly one index (in particular, a primary key or other non-unique index), and an updated data record does not fit onto a page, instead of creating an overflow access record, the updated data record is inserted into another page having available capacity and the identifier of the updated data record (pointing to this updated data record of the other page) is stored in the index. A new page is created at the end of the table and the updated data record is stored there, and the identifier of the updated data record is stored in the index if there is no page having sufficient free space.

The scanning described herein may be performed in predefined time intervals. This may have the advantage that on a regular basis OARs are cleaned up such that the database system may directly access a record instead of making a loop way via an OAR. The scanning may be performed for all indexes of a table. This way, all access paths to records that include OARs are cleaned up. This may result in overall performance being optimized.

In an embodiment, the changing by a predefined amount is a decreasing of the index counter by one. In particular, the index counter holds the number of indexes a specific record (i.e., a RID) is related to. In an embodiment, the predefined value is zero. In this case, the index counter corresponds directly to the number of indexes related to a record having a related OAR. When there are no more indexes pointing to a specific overflow record, the OAR is no longer required.

It is noted that the changing the index counter contained in the OAR may, in particular, be a decrease in value. In an embodiment, the decreasing is performed in increments of one. In this case, the predefined value is zero.

Moreover, maintaining an index information buffer may be performed by storing identifiers of OARs and all related indexes in an intermediate storage record, or alternatively, all indexes and related record identifiers of OARs. In embodiments the starting point is a RID or an index.

In an embodiment, the index information buffer is updated by removing the association of the OAR with the index and includes removing the identifier of the OAR.

In an embodiment, the database system is a relational database system.

In an embodiment, a log record entry is created for at least one of: creating an OAR, replacing the RID, changing an index counter, removing an OAR, inserting an updated data record, and creating a new page at the end of a table. Such a log record writing may be an extension to a conventional log record writing for all updates and accesses made to a database system. This may be used to ensure consistency of the database system, in particular for recovery operations.

An embodiment includes an engine for managing OARS as described above. The inclusion of the engine may ensure an optimal integration between traditional functions of a database management system and an extension in the form of the engine of managing OARs. In the following, a detailed description of the drawings will be given. All illustrations in the drawings are schematic. First, a block diagram of an embodiment for managing OARs is described. Afterwards, embodiments of several system components and related elements are described.

Figure 1:
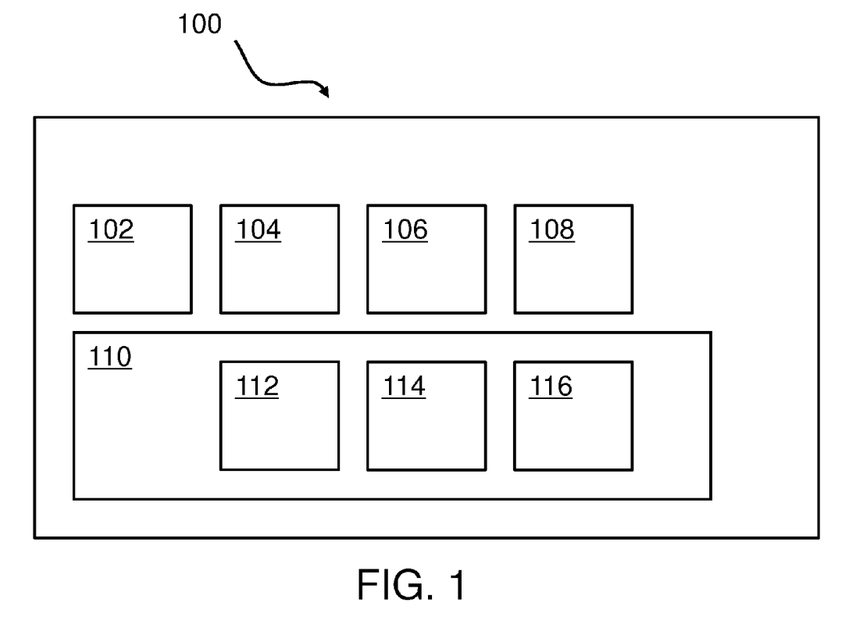
FIG. 1 shows a block diagram of an exemplary embodiment for managing overflow access records.

FIG. 1 is a block diagram 100 of an embodiment of a process for the management of OARs. In an embodiment, the database system includes tables, the tables include pages, and the pages include data records. The method shown in FIG. 1 includes receiving a database command 102 and creating an OAR 104 that includes an index counter. The OAR is created if the database command is an update command for a data record and if an updated data record does not fit onto the page of a related table. In this case, the OAR points to the updated data record on a further page of the related table, and the index counter indicates a number of indexes associated with the related table. The OAR replaces the data record related to the updated data record. In the embodiment shown in FIG. 1, the process also includes maintaining an index information buffer 106, such that for each index, identifiers of OARs are maintained together with a related index.

The process shown in FIG. 1 also includes determining if the database command is a query command using an index and accessing an OAR. In this case, the process includes replacing an identifier of the OAR in the index by an identifier of the updated data record 108, and changing the index counter in the OAR by a predefined amount 110, and if the index counter is at a predefined value after the changing, removing the OAR from the table 112, removing the identifier of the OAR from the index information buffer 114, and if the index counter is not at the predefined value after the changing, updating the index information buffer by removing the association of the OAR with the index 116.

Figure 2:
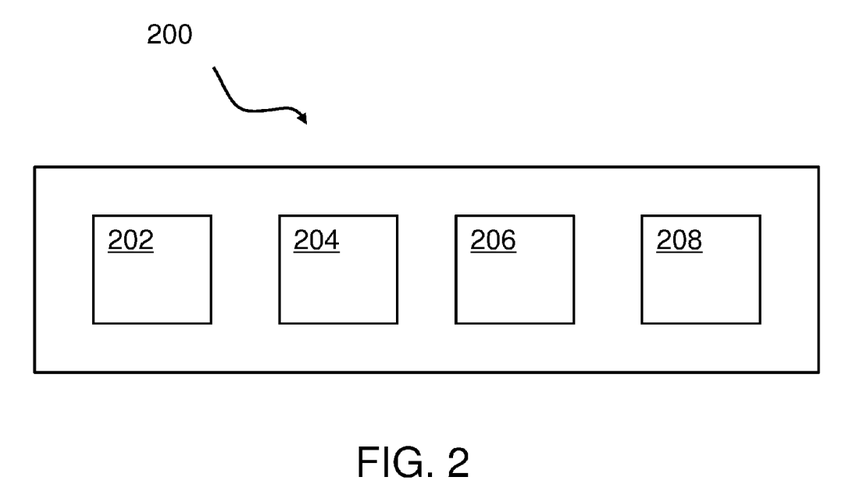
FIG. 2 illustrates an exemplary embodiment of an engine for management of overflow access records.

FIG. 2 illustrates an embodiment of an engine for management of OARs in accordance with an embodiment. The engine 200 shown in FIG. 2 for managing OARs in a database system may include tables as described above. The engine 200 shown in FIG. 2 also includes a series of units: a receiving unit 202 adapted for receiving a database command; a creating unit 204 adapted for creating an OAR including an index counter under the conditions already described; and a maintaining unit 206 adapted for maintaining an index information buffer such that for each index, identifiers of OARs are maintained together with a related index.

In addition, as shown in FIG. 2, the engine includes a replacing unit 208 that is adapted for replacing an identifier of the OAR in the index by an identifier of the updated data record, if the database command is a query command using an index and accessing an OAR. The replacing unit 208 shown in FIG. 2 is also adapted for changing the index counter included in the OAR by a predefined amount, and if the index counter is at a predefined value after the changing, removing the OAR from the table and removing the identifier of the OAR from the index information buffer. The replacing unit 208 is also adapted for updating the index information buffer by removing the association of the OAR with the index if the index counter is not at the predefined value after the changing.

Figure 3:
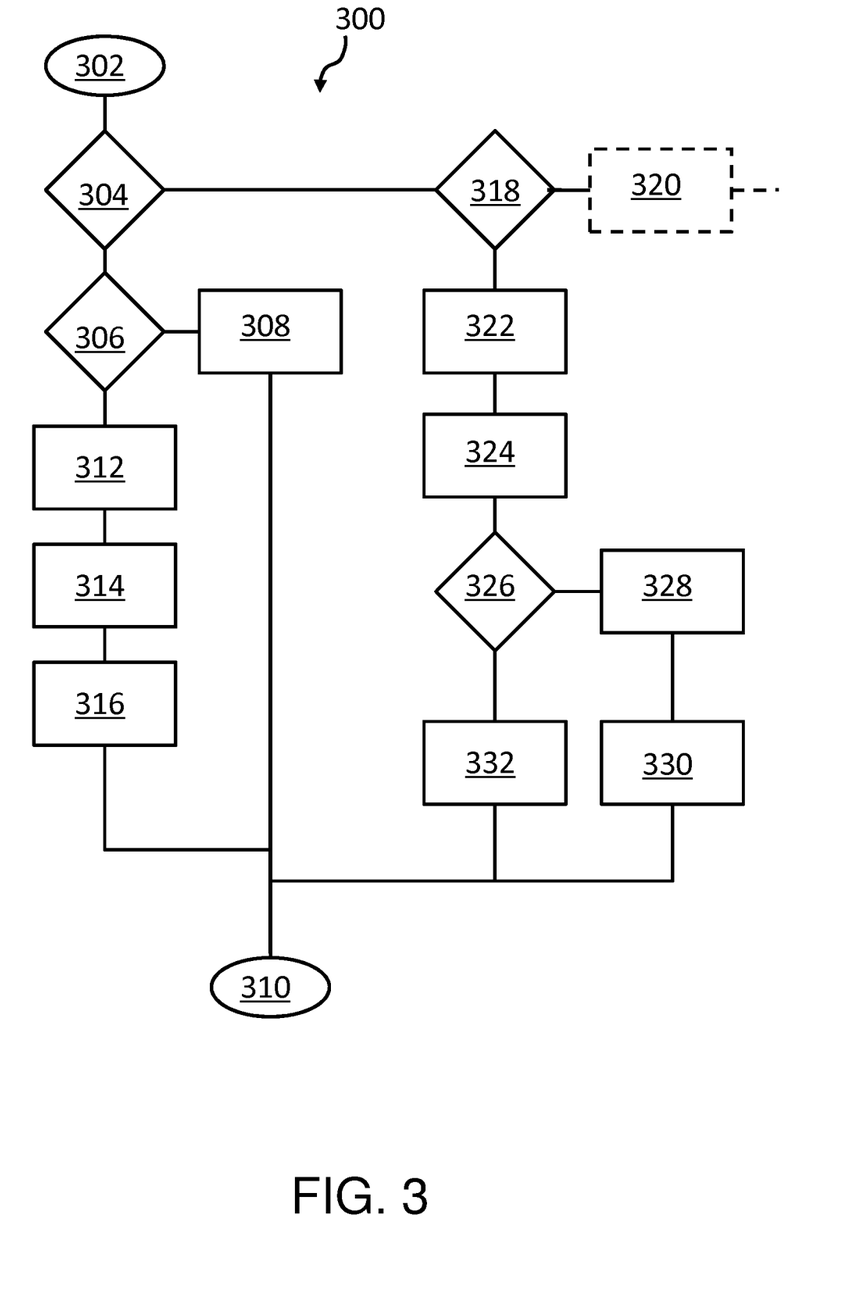
FIG. 3 shows a flow diagram for managing overflow access records in accordance with an embodiment.

FIG. 3 shows an embodiment of a flow diagram 300 for managing OARs. After the start 302, it is checked whether the database command is an update command at block 304. In case where this test is answered with "yes" block 306 is performed to determine whether the updated data record will fit onto the current database page. If the record will fit, then a normal update procedure is performed at block 308 and the procedure stops at block 310. If, as determined at block 306, the record will not fit onto the current database page, an OAR is created at block 312. In an embodiment, the OAR includes an index counter that tracks the number of indexes that relate to the table and thus, to a specific entry in the table. The entries in the table are identifiable by an identifier, e.g., a unique RID. Beside the index counter, the OAR also includes an identifier (e.g., an RID) of the updated data record that is inserted, at block 314, onto a new page in the database system.

In addition, an index information buffer is maintained at block 316 to track links between indexes and RIDs as explained above. In an embodiment, the buffer is maintained in a main memory of a computer system as well as in a long-term storage (e.g., a hard disk or within the database system itself).

If it is determined at block 304 that the database command is not an update command, processing continues at block 318 to determine if the command is a query command 318. If the command is not a query command, then the process continues at block 320 with other options. If, as determined at block 318, the command is a query command, then the RID in the index the query was initiated with, identifying the OAR is replaced at block 322 in the index with the RID of the related updated data record. An index counter in the overflow access record is decreased by one at block 324, indicating that one index less than before this update uses the OAR.

At block 326 it is determined whether the index counter has reached zero. If the index counter has reached zero, block 328 is performed to remove the related OAR completely. This is done because no index has the RID of the OAR stored. All indexes now store and use the RIDs of the related updated data records directly without making a detour via OARs. In parallel or afterwards, the entry in the index information buffer is removed at block 330 because there is no longer a relationship between this specific RID and the indexes. The related entry in the index information buffer does not need to be maintained any longer, it is superfluous.

If, however, the index counter has not yet reached zero, only the association between the index the query have used and the relevant RID is removed at block 332. The next time a query is performed by another index, the index counter is decreased again by one and so on until the index counter reaches zero and no OARs are required any longer for the related entry in the database.

Figure 4:
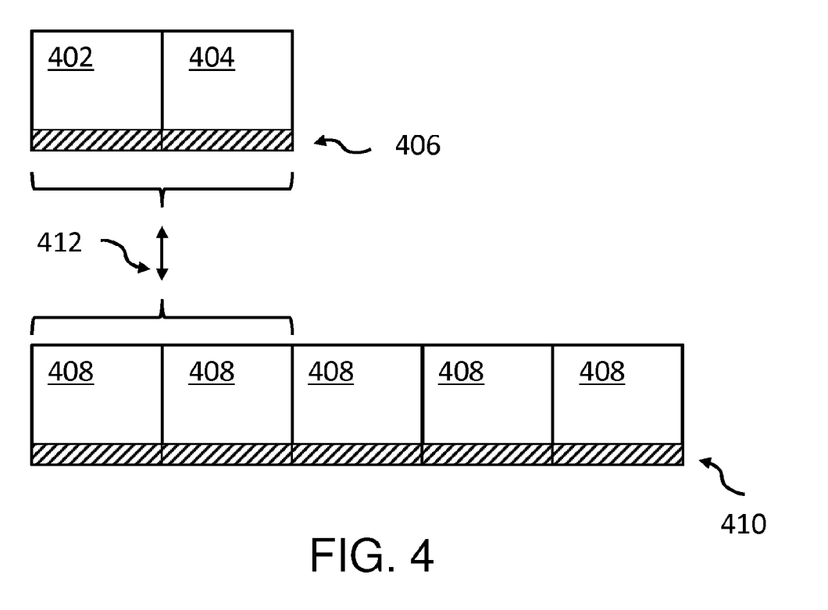
FIG. 4 illustrates percentage free space (PCTFREE) for tables on database pages.

FIG. 4 illustrates an embodiment of the concept of PCT-FREE for tables on database pages. As shown in FIG. 4, database pages 402, 404 located in a buffer are stored in a main memory of a computer system. Database pages 402, 404 relate to two database pages 408 on a storage disk. At different times, different ones of the database pages 408 of the storage system are mapped into the buffer as indicated by double arrow 412. In order to reduce the impact on the performance of a database system when new inserts of data record happen or when updated data records require more storage space than original records, database pages have unused space 406, 410 on the database pages. For example, this may initially be, for example, ten percent of the page size or any other value. However, if many updates may happen, the free space, or PCTFREE may have been used completely. This situation is discussed with reference to FIG. 5.

Figure 5:
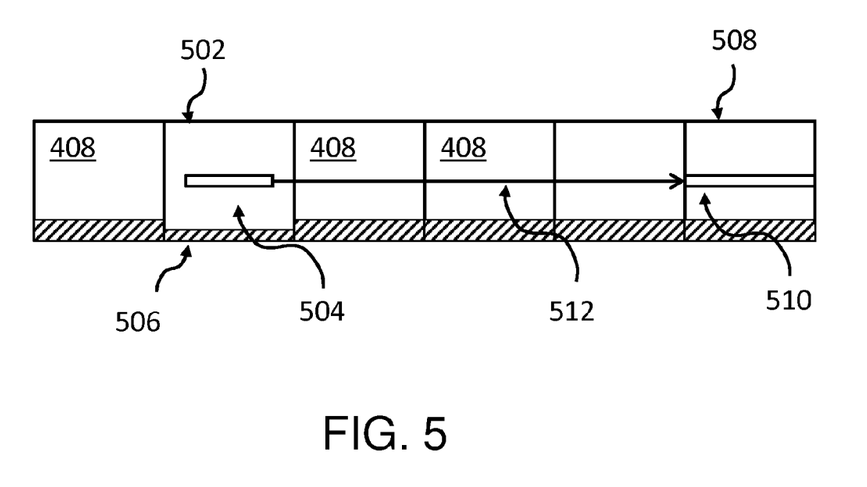
FIG. 5 illustrates an overflow access record in accordance with an embodiment.

FIG. 5 illustrates an embodiment of an OAR. As shown in FIG. 5, page 502 has run out of space and a new updated data record does not fit onto the page 502. As shown in FIG. 5, the free space 506 is too small to store the updated data record. In this case, the updated data record is stored as record 510 with a new unique RID in the table and in the database system. However, updating all indexes that refer to this table, this page and this RID accordingly may put a lot of overload onto the database system, resulting in performance degradations. Instead, in an embodiment, an OAR 504 that includes at least two fields is created: a pointer, as indicated by arrow 512, to the updated data record 510 (e.g., the identifier or RID of the updated data record 510); and an index counter that is stored in the OAR 504 which may be used as explained above in the context of FIG. 3.

Figure 6:
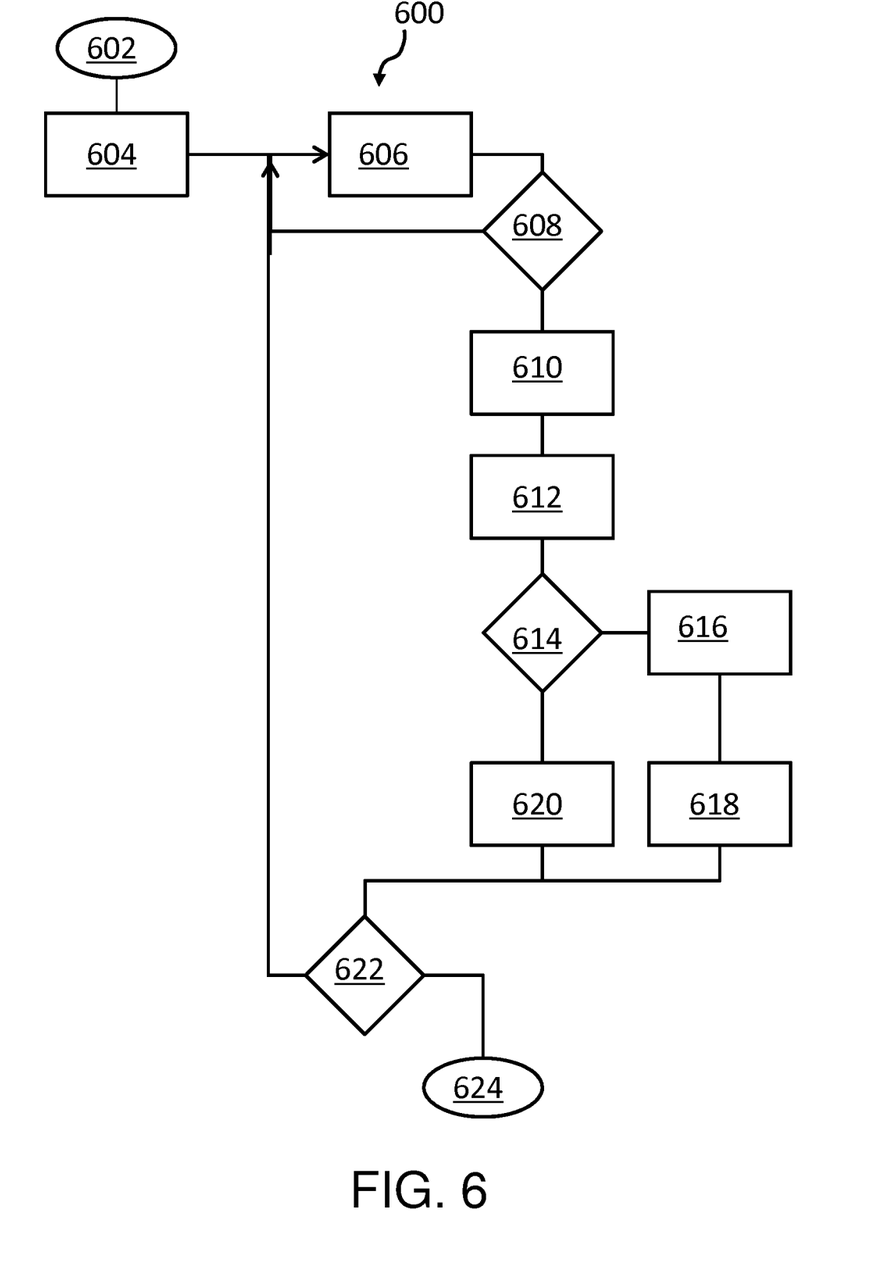
FIG. 6 illustrates a block diagram of an asynchronous clean-up process in accordance with an embodiment.

FIG. 6 illustrates a block diagram 600 of an embodiment of an asynchronous clean-up process. There are cases in which not all OARs are cleared just by query commands as explained above. For example, this may be the case if an index has not been used for a long time. This would mean that the OARs are still being maintained in the system although they may not be useful any longer. In this case, a clean-up process is performed that operates independently of any query, insert, update, or delete database command. The process may be part of a database reorganization procedure ("database reorg") or independent of it. In an embodiment, the procedure starts at block 602. One of the indexes of a database table is selected at block 604. A next index entry is read at block 606. In an embodiment, it is assumed that the reading starts at a "position zero", and that a next index entry is the first entry. If the reading starts anywhere in the index, a round robin principle for the index table may be used. At block 608, it is determined whether the RID of the index entry is also specified in the index information buffer. In case of "no", block 606 is performed to read the next index entry. Otherwise, the RID found in the index is replaced by the RID of the updated data record at block 610. As a consequence, a next read command via the relevant index for this RID is not detoured via the related overflow index records, but instead directly accesses the related updated data record to which the OAR was pointing. In parallel, or next, at block 612 the index counter in the related OAR is decreased by one. A test is performed at block 614 to determine whether the index counter has reached zero. If this is the case, the OAR is removed at block 616, and the corresponding RID entry in the index information buffer is removed at block 618.

In the case where the index counter has not reached zero, only the association between the relevant RID and the index is removed at block 620. A test is performed at block 622 to determine if an end of the index has been reached. If "yes" the procedure stops at block 624 for this index and continues with a next index. If the end of the index has not been reached, the process continues with reading the next entry of the index at block 606.

Embodiments of the engine 200 and the processes described herein may be implemented on virtually any type of computer, suitable for storing and/or executing program code. As shown in the embodiment of the computer system 700 in FIG. 7, the computer system 700, includes one or more processors 702 with one or more cores per processor 702, associated memory elements 704, an internal storage device 706 (e.g., a hard disk, an optical drive such as a compact disk drive or digital video disk (DVD) drive, a flash memory stick, etc.), and numerous other elements and functionalities typical of today's computers (not shown). The memory elements 704 may include a main memory, employed during actual execution of the program code, and a cache memory, which provides temporary storage for at least some program code or data in order to reduce the number of times, code must be retrieved from external bulk storage 716 for execution. Elements inside the computer system 700 may be linked together by means of a bus system 718 with corresponding adapters. Additionally, a database system 720 may be part of the computer system 700. As part of the database system 720 or independently (not shown) to the database system, an engine 200 of managing overflow access records is part of the computer system 700.

Figure 7:
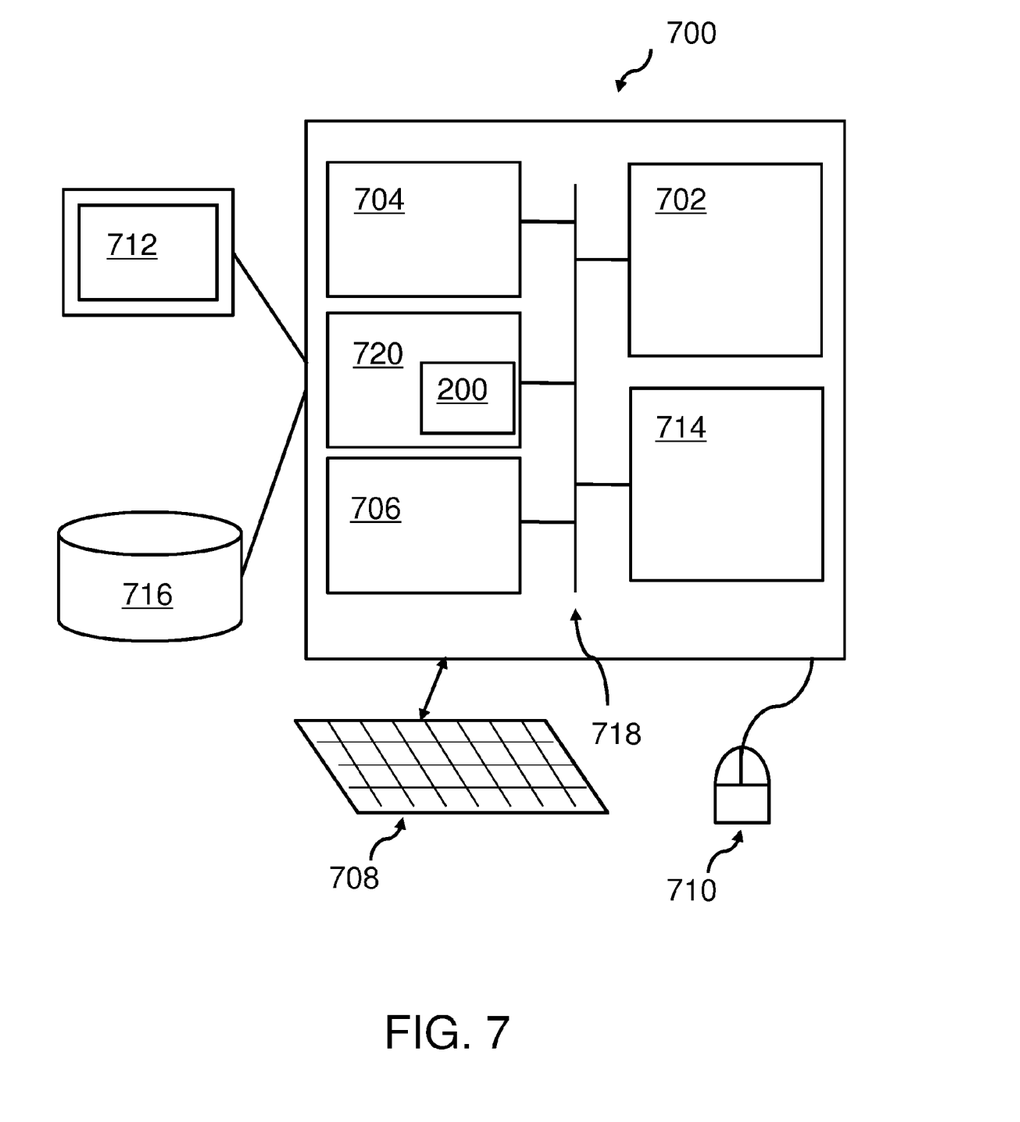
FIG. 7 illustrates a computer system that includes a database system in accordance with an embodiment.

The computer system 700 may also include input means, such as a keyboard 708, a mouse 710, or a microphone (not shown). Furthermore, the computer system 700 may include output means, such as a monitor 712 (e.g., a liquid crystal display (LCD), a plasma display, a light emitting diode display (LED), and/or a cathode ray tube (CRT) monitor). The computer system 700 may be connected to a network (e.g., a local area network (LAN), a wide area network (WAN), such as the Internet, or any other similar type of network, including wireless networks via a server network adapter 714 and/or storage system. This allows a coupling to other computer systems. Those skilled in the art will appreciate that many different types of computer systems exist, and the aforementioned input and output means may take other forms. Generally speaking, the computer system 700 includes at least the minimal processing, input and/or output means, necessary to practice embodiments of the invention.

Further, those skilled in the art will appreciate that one or more elements of the aforementioned computer system 700 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

While the invention has been described with respect to a limited number of embodiments, those skilled in the art, benefitting from this disclosure, will appreciate that other embodiments may be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. Also, elements described in association with different embodiments may be combined. It should also be noted that reference signs in the claims should not be construed as limiting elements.

It should be noted that embodiments may take the form of an entire hardware implementation, an entire software embodiment or an embodiment containing both, hardware and software elements. In a preferred embodiment, the invention may be implemented in software which includes, but is not limited to, firmware, resident software and microcode.

In one embodiment, a data processing program for execution in a data processing system may be provided comprising software code portions for performing the method, as described above, when the program may be run on a data processing system. The data processing system may be a computer or computer system.

Furthermore, embodiments may take the form of a computer program product, accessible from a computer usable, or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims, whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

What is claimed is:

1. A method of managing overflow access records (OARs) in a database system, the method comprising:
   receiving a database command at the database system, the database system comprising tables, each table comprising pages which comprise data records;
   responsive to the database command being an update command for a data record located on a page in a table and to an updated data record generated by the update command not fitting onto the page in the table:
      creating an OAR comprising an index counter and pointing to the updated data record on a further page of the table, wherein the index counter indicates a number of indexes associated with the table, and the created OAR replaces the data record stored on the page in the table; and
      maintaining an index information buffer such that for each index, identifiers of OARs are maintained together with a related index;
   responsive to the database command being a query command:
      using an index and accessing an OAR;
      replacing an identifier of the accessed OAR in the index by an identifier of a data record pointed to by the OAR;
      scanning the index of the table and replacing an identifier of an OAR in the index that is also located in the index information buffer in association with the index by an identifier of a data record pointed to by the located OAR;
      changing the index counter in the accessed OAR by a predefined amount;
      responsive to the index counter being equal to a predefined value after the changing, removing the accessed OAR from the table and removing the identifier of the accessed OAR from the index information buffer; and
      responsive to the index counter not being equal to the predefined value after the changing, updating the index information buffer by removing the association of the accessed OAR from the index.

2. The method according to claim 1, wherein the scanning is performed at predefined time intervals.

3. The method according to claim 1, wherein the scanning is performed for all indexes of a table.

4. The method according to claim 1, further comprising responsive to the table having no indexes, to the database command being the update command, and to the updated record not fitting onto the page:
   creating an OAR;
   responsive to another page in the table having sufficient free space, inserting the updated data record into the another page of the table; and
   responsive to no other pages in the table having sufficient free space, creating a new page at an end of the table, and storing the updated data record in the new page.

5. The method according to claim 1, further comprising:
   responsive to the table having exactly one index, to the database command being the update command, and to the updated record not fitting onto the page:
   creating an OAR;
   inserting the updated data record into another page having available capacity; and
   storing the identifier of the updated data record in the exactly one index;
   responsive to another page in the table having sufficient free space, inserting the updated data record into the another page of the table and storing the identifier of the updated data record in the exactly one index; and
   responsive to no other pages in the table having sufficient free space, creating a new page at an end of the table, storing the updated data record in the new page and storing the identifier of the updated data record in the exactly one index.

6. The method according to claim 1, wherein the changing by a predefined amount is a decreasing by one.

7. The method according to claim 1, wherein the predefined value is zero.

8. The method according to claim 1, wherein a log record entry is created for at least one of creating an overflow access record, replacing the identifier, changing the index counter, and removing the OAR.

9. An engine for managing overflow access records (OARs) in a database system, the engine comprising a receiving unit, a creating unit, a maintaining unit, and a replacing unit, the engine configured to perform a method comprising:
   receiving a database command at the database system, the database system comprising tables, each table comprising pages which comprise data records; and
   responsive to the database command being an update command for a data record located on a page in a table and to an updated data record generated by the update command not fitting onto the page in the table:
      creating an OAR comprising an index counter and pointing to the updated
      data record on a further page of the table, wherein the index counter indicates a number of indexes associated with the table, and the created OAR replaces the data record stored on the page in the table;
   maintaining an index information buffer such that for each index, identifiers of OARs are maintained together with a related index; and
   responsive to the database command being a query command:
   using an index and accessing an OAR;
   replacing an identifier of the accessed OAR in the index by an identifier of a data record pointed to by the OAR;
   scanning the index of the table and replacing an identifier of an OAR in the index that is also located in the index information buffer in association with the index by an identifier of a data record pointed to by the located OAR;
   changing the index counter in the accessed OAR by a predefined amount;
   responsive to the index counter being equal to a predefined value after the changing, removing the accessed OAR from the table and removing the identifier of the accessed OAR from the index information buffer; and
   responsive to the index counter not being equal to the predefined value after the changing, updating the index information buffer by removing the association of the accessed OAR with the index.

10. The engine according to claim 9, wherein the scanning is performed at predefined time intervals.

11. The engine according to claim 9, wherein the scanning is performed for all indexes of a table.

12. The engine according to claim 9, wherein the method further comprises responsive to the table having no indexes, to the database command being the update command, and to the updated record not fitting onto the page:
creating an OAR;
responsive to another page in the table having sufficient free space, inserting the updated data record into the another page of the table; and
responsive to no other pages in the table having sufficient free space, creating a new page at an end of the table, and storing the updated data record in the new page.

13. The engine according to claim 9, wherein the method further comprises responsive to the table having exactly one index, to the database command being the update command, and to the updated record not fitting onto the page:
creating an OAR;
inserting the updated data record into another page having available capacity;
storing the identifier of the updated data record in the exactly one index;
responsive to another page in the table having sufficient free space, inserting the updated data record into the another page of the table and storing the identifier of the updated data record in the exactly one index; and
responsive to no other pages in the table having sufficient free space, creating a new page at an end of the table, storing the updated data record in the new page and storing the identifier of the updated data record in the exactly one index.

14. The engine according to claim 9, wherein the changing by a predefined amount is a decreasing by one.

15. The engine according to claim 9, wherein the predefined value is zero.

16. The engine according to claim 9, wherein a log record entry is created for at least one of creating an OAR, replacing the identifier, changing the index counter, and removing the accessed OAR.

17. A computer program product for managing overflow access records (OARs) in a database system, the computer program product comprising:
a non-transitory computer readable storage medium having computer readable program code embodied therewith, the computer readable program code comprising:
computer readable program code configured for:
receiving a database command at the database system, the database system comprising tables, each table comprising pages which comprise data records;
responsive to the database command being an update command for a data record located on a page in a table and to an updated data record generated by the update command not fitting onto the page in the table:
creating an OAR comprising an index counter and pointing to the updated data record on a further page of the table, wherein the index counter indicates a number of indexes associated with the table, and the created OAR replaces the data record stored on the page in the table;
maintaining an index information buffer such that for each index, identifiers of OARs are maintained together with a related index; and
responsive to the database command being a query command:
using an index and accessing an OAR;
replacing an identifier of the accessed OAR in the index by an identifier of a data record pointed to by the OAR;
scanning the index of the table and replacing an identifier of an OAR in the index that is also located in the index information buffer in association with the index by an identifier of a data record pointed to by the located OAR;
changing the index counter in the accessed OAR by a predefined amount;
responsive to the index counter being equal to a predefined value after the changing, removing the accessed OAR from the table and removing the identifier of the accessed OAR from the index information buffer; and
responsive to the index counter not being equal to the predefined value after the changing, updating the index information buffer by removing the association of the accessed OAR with the index.

* * * * *